United States Patent
Dohmen et al.

(10) Patent No.: US 6,690,869 B2
(45) Date of Patent: Feb. 10, 2004

(54) MULTICOMPONENT GLASS, GLASS FIBER, TWISTER AND TAPER

(75) Inventors: Petrus Jacobus Maria Dohmen, Eindhoven (NL); Johannes Cornelis Antonius Van Ham, Eindhoven (NL); Adrianus Johannes Hendricus Petrus Van Der Pol, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 20 days.

(21) Appl. No.: 10/043,531

(22) Filed: Jan. 11, 2002

(65) Prior Publication Data

US 2003/0072554 A1 Apr. 17, 2003

(30) Foreign Application Priority Data

Feb. 5, 2001  (EP) ............................. 01200394

(51) Int. Cl.⁷ ................................. G02B 6/02
(52) U.S. Cl. .................. 385/123; 501/37; 501/38; 385/141; 385/142
(58) Field of Search ................ 385/123–127; 501/51, 37, 38; 106/54

(56) References Cited

U.S. PATENT DOCUMENTS

| | | | |
|---|---|---|---|
| 3,561,986 A | | 2/1971 | Broemer et al. ............ 106/53 |
| 3,879,207 A | * | 4/1975 | Hartman ................... 106/54 |
| 4,932,752 A | * | 6/1990 | Krashkevich ............ 350/96.34 |
| 5,137,850 A | * | 8/1992 | Clement et al. ........... 501/51 |

FOREIGN PATENT DOCUMENTS

| | | | | |
|---|---|---|---|---|
| DE | 3038205 A1 | 4/1981 | ............ | C03C/3/14 |
| DE | 31026990 A1 | 8/1982 | ............ | C03C/3/14 |
| DE | 3500578 A1 | 10/1986 | ............ | C03C/3/068 |
| GB | 783110 A | 9/1957 | | |
| GB | 2137981 A | 10/1984 | ............ | C03C/3/14 |

OTHER PUBLICATIONS

Patent Abstracts of Japan, Takeuchi Shozo, "Tantalum Oxide–Free Optical Glass of High Refraction," Publication No. 56100151, Nov. 8, 1981, Application No. 55000788, Aug. 1, 1980.

Patent Abstracts of Japan, Nakahara Muneo, "Optical Glass," Publication No. 11071129, Mar. 16, 1999, Application No. 10139162, Jun. 5, 1998.

Database WPI, Section Ch, Week 199610, Derwent Publications Ltd., London, GB; Class L01, AN 1996-096210, XP002194729 & RU 2036867C (Lytkarino Optical Glass Wks), Sep. 6, 1995.

* cited by examiner

*Primary Examiner*—Frank G. Font
*Assistant Examiner*—Michael P. Mooney

(57) ABSTRACT

Cd-free multicomponent glass to be used in particular as core glass (2) in glass fibers for optical twisters and tapers, the glass being of the lanthanide flint type and comprising the following main constituents (in mol %):

| | |
|---|---|
| $B_2O_3$ | 20–70 |
| $ZnO$ | 1–15 |
| Lanthanide oxide | 1–23 |
| $ZrO_2$, and/or $HfO_2$ | 1–10 |
| $As_2O_3$ | 0.1–0.3. |

9 Claims, 2 Drawing Sheets

MULTICOMPONENT GLASS, GLASS FIBER, TWISTER AND TAPER

The invention relates to a multicomponent glass for light-transmitting bodies, for use as core glass in glass fibers.

Optical components using light transmission fibers as a light path are usable in variable fields. Due to the special requirements imposed on their application, only certain cadmium-containing multicomponent glasses are currently available commercially for use as core glasses in glass fibers for twisters and tapers. For example, a large difference of refractive index between core glass and cladding glass is desirable. The larger this difference, the thinner the twister or the taper can be. Furthermore, this application imposes specific requirements on, inter alia, expansion, hardness and crystallization. Glass fibers made of multicomponent glasses tending to crystallize have, for example, considerable scattering losses.

As cadmium is more and more prohibited, there is a need for cadmium-free core glasses having further comparable or better properties.

It is therefore an object of the invention to provide cadmium-free multicomponent glass composition ranges within which glass compositions can be found which are particularly suitable as core glass in twisters and tapers.

This object of the invention is realized when a multicomponent glass is characterized by the composition as defined in claim 1.

Within the indicated range of composition, particularly glasses can be produced with a refractive index n of at least 1.75 and an (American) softening point of between 525° C. and 725° C. and particularly between 600° C. and 725° C.

The invention also relates to a glass fiber for light transmission, a twister or a taper, characterized in that the core components consist of a glass having a composition as defined according to the invention. The invention also relates to night-vision binoculars with such a twister.

A characteristic feature of the composition of the (core) glass according to the invention is that it comprises $B_2O_3$, ZnO, $La_2O_3$ and/or $As_2O_3$, $La_2O_3$ or another rare earth (lanthanide) oxide, and $ZrO_2$ and/or $HfO_2$ as main constituents, and $Sb_2O_3$ and/or $As_2O_3$. $La_2O_3$ or another rare earth oxide (including $Y_2O_3$) functions as a glass shaper in this case.

The glass according to the invention preferably comprises no or a minimal quantity of oxides of Na, K, Li and Cs because they soften the glass and decrease the refractive index.

In accordance with a first embodiment, the glass complies with the composition as defined in claim 5.

In accordance with a second embodiment, the glass complies with the composition as defined in claim 6.

In accordance with a third embodiment, the glass complies with the composition as defined in claim 7.

A characteristic feature of the first embodiment is the slightly higher refractive index n which may range between 1.75 and 1.79, in combination with favorable values of the coefficient of expansion α (30° C. to 300° C.) which may be in the range of 67 to $73 \times 10^{-7}$ $K^{-1}$, and the viscosity (American softening point ranging between 675° C. and 725° C.).

A characteristic feature of the second embodiment is the even slightly higher refractive index (1.76 to 1.79) in combination with a value of α in the range of 63 to $71 \times 10^{-7}$ $K^{-1}$, and an American softening point of between 600° C. and 690° C.

A characteristic feature of the third embodiment are the even higher values of the refractive index that can be achieved, in combination with a value of α in the range of 65 to $73 \times 10^{-7}$ $K^{-1}$, and an American softening point of between 650° C. and 725° C.

The main constituents in said compositions are necessary to give the Cd-free core glass its basic properties.

The optional constituents defined in the claims are used to fine-tune the basic properties and/or to give the glass extra properties without its properties being affected.

For the envisaged object, a glass having the composition as defined in claim 8 has been found to be very suitable, which a refractive index n of 1.8, an American softening point at 718° C. and an intrinsic transmission Ti of at least 0.99. Core glass rods may be drawn from molten liquid having the desired composition. An alternative is to mold the molten liquid in special molds. Light transmission glass fibers can be manufactured by means of the core glass according to the invention and a cladding glass in accordance with known methods, for example, a double crucible method or a rod-in-tube method. A bundle of fibers can be made from a plurality of glass fibers. By twisting a bundle of fibers, a twister is obtained. This twister rotates the image coming from, for example, a photomultiplier and is used in night-vision telescopes. To be able to comply with all of these manufacturing steps, a special core glass is necessary which must also be free from Cd in the present case. A bundle of fibers, which is twisted or not twisted, can also be given a cross-section extending from small to large. Then a bundle of fibers referred to as taper is concerned.

These and other aspects of the invention are apparent from and will be elucidated with reference to the embodiments described hereinafter.

Figure 1:
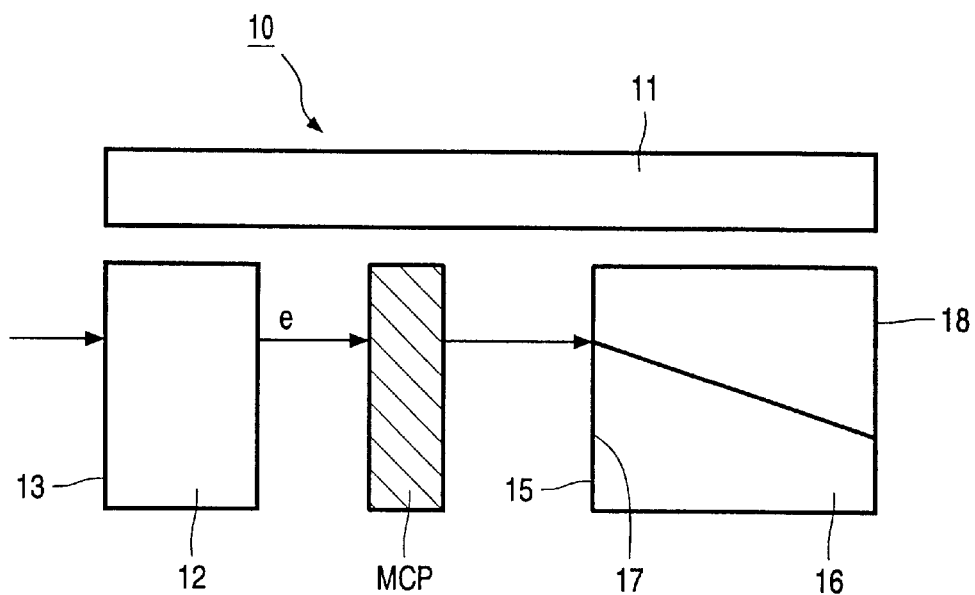
FIG. 1 shows diagrammatically the arrangement of a twister in night-vision telescope.

A general embodiment of a night-vision telescope 10 (FIG. 1) is provided with a power supply 11, a fiber-optical system 12 with an entrance face 13 on which photons are incident, and an exit face provided with a photocathode 14. Electrons e emitted by the photocathode 14 are multiplied in the MCP device. The multiplied electrons are incident on a phosphor layer 15. The phosphor layer 15 emits photons which go from an entrance face 17 of the twister via bundled transmission fibers to an exit face 18.

Figure 2:
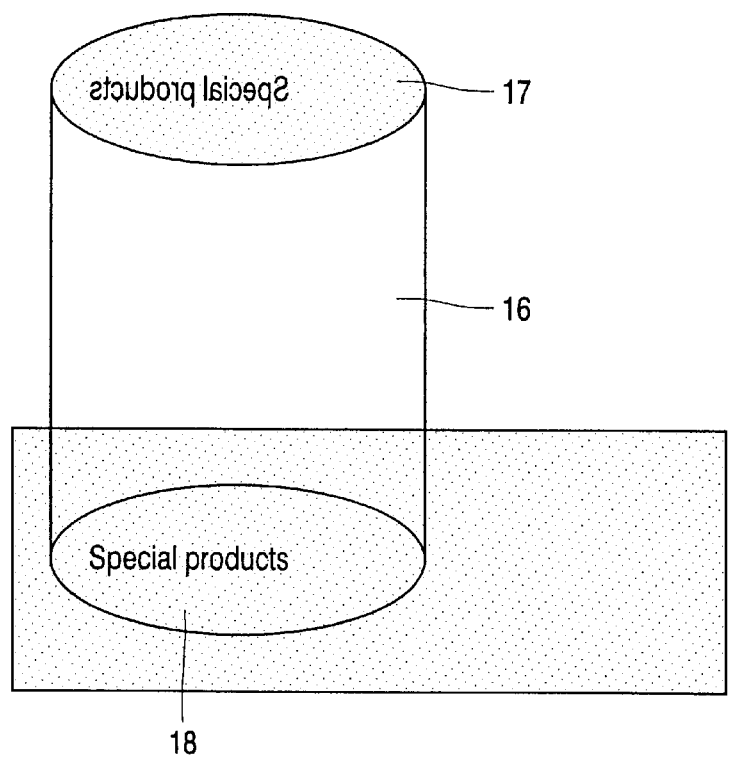
FIG. 2 shows diagrammatically a twister.
Figures 3, 4, 5:
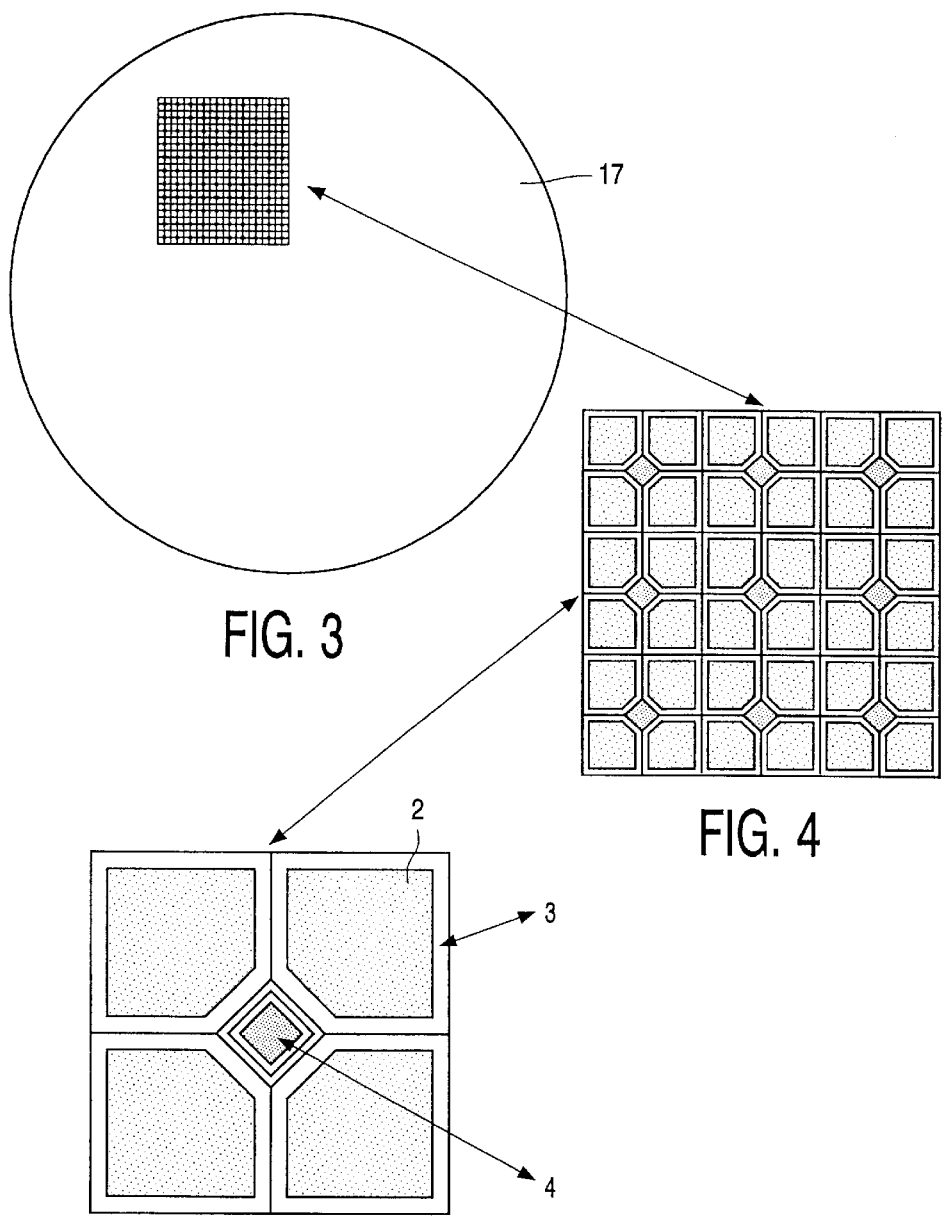
FIG. 3 is a diagrammatic plan view of a twister.
FIG. 4 is an enlarged detail of FIG. 3.
FIG. 5 is an enlarged detail of FIG. 4.

The transmission fibers of the twister 16 shown in greater detail in FIGS. 2 and 3 not only comprise core glass 2 according to the invention but also cladding glass 3, EMA (a strongly absorbing glass) 4 and, in some cases, an envelope glass enclosing the cylindrical twister 16 like a cladding (FIG. 5). In practice, the cladding glass 3 often has a refractive index of approximately 1.5. A suitable material is, for example, Schott 8250. The core glass 2 according to the invention will be described hereinafter. Based on the inventors' recognition, this core glass must preferably comply with one or more of the following requirements, when used in twisters:

1. refractive index n at least 1.75 (at a light wavelength of 598.29 nm)
2. coefficient of expansion (30° C. to 300° C.) 60 to $80 \times 10^{-7}$ $K^{-1}$
3. no crystallization during molding
4. Ti at least 0.95 at 25 mm (Ti is the intrinsic transmission, i.e. without surface losses)
5. viscosity: (American) softening point between 600° C. and 725° C.

EXAMPLE

A plurality of core glasses of different compositions within the ranges of composition according to the invention were made in the shape of rods. The compositions and the physical values measured on the rods are given below.

|  | Sample 0 | | | Sample 00 | | |
|---|---|---|---|---|---|---|
|  | calc. mol % | calc. wt % | meas. wt % | calc. mol % | calc. wt % | meas. wt % |
| Chemical Composition | | | | | | |
| $SiO_2$ | 3.0 | | | 3.0 | 1.3 | 1.5 |
| $B_2O_3$ | 60.5 | | | 60.5 | 30.9 | 30.9 |
| $Al_2O_3$ | 1.5 | | | 1.5 | 1.1 | 1.2 |
| ZnO | 3.5 | | | 3.5 | 2.1 | 2.3 |
| CdO | 10.0 | | | | | |
| PbO | | | | 10.0 | 16.4 | 17.2 |
| $La_2O_3$ | 17.0 | | | 17.0 | 40.6 | 39.0 |
| $TiO_2$ | | | | | | 0.0 |
| $ZrO_2$ | 3.0 | | | 3.0 | 2.7 | 2.6 |
| $Ta_2O_5$ | 1.5 | | | 1.5 | 4.9 | 5.3 |
| Refr.index n | | 1.755 | | | 1.773 | |
| Absorption [$cm^{-1}$] | | | | | | |
| 480 nm | | 0.008 | | | 0.008 | |
| 540 nm | | 0.004 | | | 0.004 | |
| 620 nm | | 0.004 | | | — | |
| 700 nm | | 0.004 | | | — | |
| Fiber viscosity [° C.] | | | | | | |
| Strain point | | 634 | | | 605 | |
| Annealing point | | 640 | | | 610 | |
| Philips softening Point | | 646 | | | 615 | |
| American Softening point | | 703 | | | 670 | |
| Expansion 30–300 [° C.*$10^{-7}$] | | 66 | | | 67 | |

|  | Sample 1 | | | Sample 2 | | |
|---|---|---|---|---|---|---|
| Chemical composition (mol %) | | | | | | |
| $SiO_2$ | — | | | 10.5 | | |
| $B_2O_3$ | 55.0 | | | 45.1 | | |
| BaO | 0.3 | | | 0.2 | | |
| ZnO | 13.2 | | | 13.0 | | |
| PbO | 4.5 | | | 4.1 | | |
| $Y_2O_3$ | 5.7 | | | 5.6 | | |
| $La_2O_3$ | 12.3 | | | 12.1 | | |
| $Sb_2O_3$ | 0.04 | | | 0.13 | | |
| $ZrO_2$ | 6.6 | | | 6.5 | | |
| $Nb_2O_5$ | 2.8 | | | 2.8 | | |
| $SO_3$ | | | | 0.05 | | |
| Refr.index n | 1.800 | | | 1.800 | | |
| Ti 25 mm thickness | | | | | | |
| 480 nm | 0.99 | | | | | |
| 540 nm | 1.00 | | | | | |
| 620 nm | 1.00 | | | | | |
| 700 nm | 1.00 | | | | | |
| Fiber viscosity [° C.] | | | | | | |
| Strain point | 622 | | | 612 | | |
| Annealing point | 630 | | | 627 | | |
| Philips softening point | 634 | | | 633 | | |
| American softening point | 688 | | | 718 | | |

|  | Sample 3 | Sample 4 | Sample 5 | Sample 6 | Sample 7 |
|---|---|---|---|---|---|
| Chemical composition (mol %) | | | | | |
| $SiO_2$ | — | 5.0 | 0.0 | 5.0 | 10.5 |
| $B_2O_3$ | 49.8 | 44.8 | 44.8 | 49.8 | 45.1 |
| $Al_2O_3$ | 5.0 | 5.0 | 10.0 | | 0.1 |
| BaO | 0.2 | 0.2 | 0.3 | 0.2 | 3.5 |
| ZnO | 13.1 | 13.1 | 13.1 | 13.1 | 13.0 |
| PbO | 4.4 | 4.5 | 4.4 | 4.5 | 4.1 |
| $Y_2O_3$ | 5.6 | 5.6 | 5.6 | 5.6 | 5.6 |
| $La_2O_3$ | 12.3 | 12.3 | 12.3 | 12.3 | 12.1 |
| $Sb_2O_3$ | 0.04 | 0.04 | 0.04 | 0.04 | 0.13 |
| $ZrO_2$ | 6.6 | 6.6 | 6.6 | 6.6 | 3.3 |
| $Nb_2O_5$ | 2.8 | 2.8 | 2.8 | 2.8 | 2.8 |
| Fiber viscosity [° C.] | | | | | |
| Strain point | 604 | | | | 622 |
| Annealing point | 616 | | | | 630 |
| Philips softening point | 622 | | | | 634 |
| American softening point | 700 | | | | 694 |

|  | Sample 30 | | | Sample 31 | | |
|---|---|---|---|---|---|---|
|  | calc. mol % | calc. wt % | meas. wt % | calc. mol % | calc. wt % | meas. wt % |
| Chemical composition | | | | | | |
| $SiO_2$ | 33.2 | 16.5 | | 8.2 | 3.7 | |
| $B_2O_3$ | 24.3 | 14.0 | | 56.1 | 29.4 | |
| $Al_2O_3$ | 6.3 | 5.3 | | 1.2 | | |
| $Na_2O$ | | | | | | |
| $K_2O$ | | | | | | |
| CaO | | | | | | |
| BaO | 0.3 | 0.3 | | 0.3 | 0.3 | |
| ZnO | 2.5 | 1.7 | | 2.1 | 1.3 | |
| CdO | | | | | | |
| PbO | 30.6 | 56.3 | | 2.8 | 4.7 | |
| $Fe_2O_3$ | | | | | | |
| $Y_2O_3$ | | | | 3.7 | 6.2 | |
| $La_2O_3$ | 1.6 | 4.3 | | 19.2 | 47.2 | |
| $Sb_2O_3$ | 0.04 | 0.1 | | 0.1 | 0.1 | |
| $TiO_2$ | | | | | | |
| $ZrO_2$ | 1.6 | 1.6 | | 7.7 | 7.1 | |
| $V_2O_5$ | | | | | | |
| $Nb_2O_5$ | | | | | | |
| $Ta_2O_5$ | | | | | | |
| $WO_3$ | | | | | | |
| F— | 1.9 | 0.3 | | | | |
| Refr.index n | 1.749 | | | 1.755 | | |
| Absorption [$cm^{-1}$] | | | | | | |
| 480 nm | 0.027 | | | 0.008 | | |
| 540 nm | 0.008 | | | 0.003 | | |
| 620 nm | 0.017 | | | 0.002 | | |
| 700 nm | 0.007 | | | 0.001 | | |
| Fiber viscosity [° C.] | | | | | | |
| Strain point | | | | | | |
| Annealing point | | | | | | |
| Philips softening point | | | | | | |

| | Sample 32 | | | Sample 33 | | | Sample 34 | | | Sample 35 | | |
|---|---|---|---|---|---|---|---|---|---|---|---|---|
| | calc. mol % | calc. wt % | meas. wt % | calc. mol % | calc. wt % | meas. wt % | calc. mol % | calc. wt % | meas. wt % | calc. mol % | calc. wt % | Meas. Wt % |
| Chemical composition | | | | | | | | | | | | |
| $SiO_2$ | | | | 3.3 | 1.5 | | | | | 8.0 | 4.2 | |
| $B_2O_3$ | 61.0 | 31.3 | | 49.6 | 27.0 | | 55.0 | 30.0 | | 55.5 | 33.6 | |
| $Al_2O_3$ | | | | | | | | | | | | |
| $Na_2O$ | | | | | | | | | | | | |
| $K_2O$ | | | | | | | | | | | | |
| CaO | | | | 4.4 | 1.9 | | | | | | | |
| BaO | 0.3 | 0.3 | | 6.5 | 7.8 | | 0.3 | 0.3 | | 0.3 | 0.3 | |
| ZnO | 4.3 | 2.6 | | 5.6 | 3.6 | | 13.2 | 8.4 | | 11.3 | 8.0 | |
| CdO | | | | | | | | | | | | |
| PbO | | | | 1.9 | 3.4 | | 4.5 | 7.8 | | | | |
| $Fe_2O_3$ | | | | | | | | | | | | |
| $Y_2O_3$ | 5.3 | 8.8 | | 1.6 | 2.8 | | 5.7 | 10.0 | | 2.3 | 4.5 | |
| $La_2O_3$ | 18.9 | 45.5 | | 14.2 | 36.3 | | 12.3 | 31.4 | | 12.6 | 35.7 | |
| $Sb_2O_3$ | 0.1 | 0.1 | | 0.04 | 0.1 | | 0.04 | 0.1 | | 0.04 | 0.1 | |
| $TiO_2$ | | | | 2.6 | 1.6 | | | | | | | |
| $ZrO_2$ | 7.9 | 7.2 | | 6.8 | 6.5 | | 6.6 | 6.4 | | 7.8 | 8.4 | |
| $V_2O_5$ | | | | | | | | | | | | |
| $Nb_2O_5$ | 1.7 | 3.3 | | 3.6 | 7.6 | | 2.8 | 5.9 | | 2.4 | 5.5 | |
| $Ta_2O_5$ | | | | | | | | | | | | |
| $WO_3$ | 0.7 | 1.2 | | | | | | | | | | |
| F— | 10.7 | 1.5 | | | | | | | | | | |
| Refr.index n | | 1.789 | | | 1.807 | | | 1.800 | | | 1.760 | |
| Absorption [$cm^{-1}$] | | | | | | | | | | | | |
| 480 nm | | 0.035 | | | 0.017 | | | 0.011 | | | | |
| 540 nm | | 0.016 | | | 0.005 | | | 0.004 | | | | |
| 620 nm | | 0.030 | | | 0.003 | | | 0.002 | | | | |
| 700 nm | | 0.014 | | | 0.001 | | | 0.001 | | | | |
| Fiber viscosity [° C.] | | | | | | | | | | | | |
| Strain point | | | | | | | | 622 | | | | |
| Annealing point | | | | | | | | 630 | | | | |
| Philips softening point | | | | | | | | 634 | | | | |
| American softening point | | | | | | | | 688 | | | | |

In summary, the invention relates to a Cd-free multicomponent glass, particularly for use as a core glass in transmission fibers for optical twisters, tapers, etc., which glass is of the lanthanide flint type and comprises the following main constituents (in mol %):

| | |
|---|---|
| $B_2O_3$ | 20–70 |
| ZnO | 1–15 |
| Lanthanide oxide | 1–23 |
| $ZrO_2$, and/or $HfO_2$ | 1–10 |
| $As_2O_3$ | 0.1–0.3 |

What is claimed is:

1. A multicomponent glass for light-transmitting bodies for use as a core glass in glass fibers, characterized in that the glass is a glass of the lanthanide flint type having the following composition in mol %:

| | |
|---|---|
| $SiO_2$ | 0–40 |
| $B_2O_3$ | 20–70 |
| ZnO | 1–15 |
| PbO | 0–35 |
| Lanthanide oxide | 1–23 |
| $ZrO_2$ and/or $HfO_2$ | 1–10 |
| MgO and/or CaO | 0–7 |
| SrO and/or BaO | 0–9 |
| $TiO_2$ | 0–4 |
| $Sb_2O_3$ and/or $As_2O_3$ | 0.1–0.3 |
| $Nb_2O_5$ | 0–5 |
| $Ta_2O_5$ | 0–3 |
| $WO_3$ | 0–2 |
| $Al_2O_3$ | 0–8 |
| F | 0–15. | without CdO,
    with a refractive index n=at least 1.74,
    an American softening point of between 525° C. and 725° C., and
    a coefficient of expansion of between 30° C. and 300° C. of between 60 and 80×10$^{-7}$.

2. A glass fiber for light transmission, characterized in that the core component comprises a glass as claimed in claim 1.

3. A twister for light transmission, characterized in that the core component comprises a glass as claimed in claim 1.

4. A taper for light transmission, characterized in that the core component comprises a glass as claimed in claim 1.

5. A multicomponent glass as claimed in claim 1, having the following composition

| | |
|---|---|
| $SiO_2$ | 5–10 |
| $B_2O_3$ | 50–60 |
| $Al_2O_3$ | 0–1 |
| ZnO | 1–5 |
| PbO | 0–5 |
| $Y_2O_3$ | 2–5 |
| $La_2O_3$ | 16–23 |
| $ZrO_2$ | 6–9 |
| CaO | 0–1 |
| BaO | 0–1 |
| CaO + BaO | 0–1 |
| $TiO_2$ | 0–1 |
| $Nb_2O_5$ | 0–2 |
| $Ta_2O_5$ | 0–2 |
| $WO_3$ | 0–2 |
| $Nb_2O_5 + Ta_2O_5 + WO_3$ | 0–2 |
| $Sb_2O_3$ | 0.1–0.3 |
| F | 0–2. |

6. A multicomponent glass as claimed in claim 1, having the following composition

| | |
|---|---|
| $SiO_2$ | 0–5 |
| $B_2O_3$ | 54–65 |
| $Al_2O_3$ | 0–3 |
| ZnO | 2–6 |
| PbO | 8–12 |
| $Y_2O_3$ | 0–1 |
| $La_2O_3$ | 14–20 |
| $ZrO_3$ | 1–5 |
| CaO | 0–1 |
| BaO | 0–3 |
| CaO + BaO | 0–3 |
| $TiO_2$ | 0–1 |
| $Nb_2O_5$ | 0–2 |
| $Ta_2O_5$ | 0–4 |
| $WO_3$ | 0–2 |
| $Nb_2O_5 + Ta_2O_5 + WO_3$ | 0–4 |
| $Sb_2O_3$ | 0.1–0.3 |
| F | 0–2. |

7. A multicomponent glass as claimed in claim 1, having the following composition

| | |
|---|---|
| $SiO_2$ | 0–12 |
| $B_2O_3$ | 45–60 |
| $Al_2O_3$ | 0–1 |
| ZnO | 10–15 |
| PbO | 3–6 |
| $Y_2O_3$ | 4–7 |
| $La_2O_3$ | 10–15 |
| $ZrO_2$ | 5–7 |
| CaO | 0–1 |
| BaO | 0–1 |
| CaO + BaO | 0–1 |
| $TiO_2$ | 0–1 |
| $Nb_2O_5$ | 2–4 |
| $Ta_2O_5$ | 0–2 |
| $WO_3$ | 0–2 |
| $Nb_2O_5 + Ta_2O_5 + WO_3$ | 2–4 |
| $Sb_2O_3$ | 0.1–0.3 |
| F | 0–2. |

8. A multicomponent glass as claimed in claim 7, having the following composition

| | | |
|---|---|---|
| Chemical composition (mol %) | $SiO_2$ | 10.5 |
| | $B_2O_3$ | 45.1 |
| | $Al_2O_3$ | |
| | BaO | 0.2 |
| | ZnO | 13.0 |
| | PbO | 4.1 |
| | $Y_2O_3$ | 5.6 |
| | $La_2O_3$ | 12.1 |
| | $Sb_2O_3$ | 0.13 |
| | $CeO_2$ | |
| | $ZrO_2$ | 6.5 |
| | $HfO_2$ | |
| | $Nb_2O_5$ | 2.8 |
| | $Ta_2O_5$. | |

9. Night-vision telescope provided with a twister as claimed in claim 3.

* * * * *